United States Patent
Mueller et al.

(10) Patent No.: US 10,557,743 B2
(45) Date of Patent: Feb. 11, 2020

(54) REDUCTION OF POWER PEAKS IN THE SPECTRUM OF THE MEAN POWER OF FILL LEVEL MEASURING DEVICES

(71) Applicant: VEGA GRIESHABER KG, Wolfach (DE)

(72) Inventors: Christoph Mueller, Oppenau (DE); Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 235 days.

(21) Appl. No.: 15/439,617

(22) Filed: Feb. 22, 2017

(65) Prior Publication Data
US 2017/0241825 A1 Aug. 24, 2017

(30) Foreign Application Priority Data

Feb. 22, 2016 (EP) ...................................... 16156684

(51) Int. Cl.
*G01F 23/284* (2006.01)
*G01S 7/35* (2006.01)
*G01S 13/00* (2006.01)

(52) U.S. Cl.
CPC .............. *G01F 23/284* (2013.01); *G01S 7/35* (2013.01)

(58) Field of Classification Search
CPC ..... H03C 3/0925; G01S 13/34; G01S 13/345; G01S 13/282
USPC .................................................. 342/127–128
See application file for complete search history.

(56) References Cited

U.S. PATENT DOCUMENTS

| | | | | |
|---|---|---|---|---|
| 4,044,355 A | * | 8/1977 | Edvardsson | G01F 23/284 342/124 |
| 5,309,160 A | * | 5/1994 | Powell | G01S 13/282 342/128 |
| 7,002,512 B2 | * | 2/2006 | Isaji | G01S 13/345 342/109 |

(Continued)

FOREIGN PATENT DOCUMENTS

| | | |
|---|---|---|
| CN | 1545614 A | 11/2004 |
| CN | 102016524 A | 4/2011 |

(Continued)

OTHER PUBLICATIONS

Office Action dated Dec. 4, 2019 in China Patent Application No. 201710096139.4 (w/English-language translation).

*Primary Examiner* — Bernarr E Gregory
(74) *Attorney, Agent, or Firm* — Oblon, McClelland, Maier & Neustadt, L.L.P.

(57) ABSTRACT

A fill level measuring device designed for the generation and emission of a transmission signal, wherein the transmission signal includes at least one frequency ramp. In order to determine the level of a filling material in a vessel, only frequencies within a fundamental frequency interval are used. In this case, the minimal frequency of the fundamental frequency interval is greater than the minimal frequency of the frequency ramp and/or the maximal frequency of the fundamental frequency interval is smaller than the maximal frequency of the frequency ramp. The approach provides a reduction of power peaks in the frequency spectrum of the mean power of fill level measuring devices, which peaks result from times in which the fill level measuring device emits a constant frequency before the beginning of or after a frequency ramp.

13 Claims, 8 Drawing Sheets

(56) References Cited

U.S. PATENT DOCUMENTS

| | | | |
|---|---|---|---|
| 7,508,337 B2* | 3/2009 | Morinaga | G01S 13/34 |
| | | | 342/109 |
| 7,586,435 B1 | 9/2009 | Edvardsson | |
| 8,085,097 B2* | 12/2011 | Cloutier | H03C 3/0925 |
| | | | 331/16 |
| 8,390,506 B2* | 3/2013 | Focke | G01S 13/345 |
| | | | 342/112 |
| 8,471,760 B2* | 6/2013 | Szajnowski | G01S 13/34 |
| | | | 342/104 |
| 10,094,920 B2* | 10/2018 | Rao | G01S 13/343 |
| 2013/0213132 A1 | 8/2013 | Wegemann | |
| 2014/0253147 A1 | 9/2014 | Kleman et al. | |
| 2015/0007654 A1 | 1/2015 | Fehrenbach et al. | |

FOREIGN PATENT DOCUMENTS

| | | | | |
|---|---|---|---|---|
| CN | 104034391 A | | 9/2014 | |
| DE | 10 2009 013 300 A1 | | 10/2009 | |
| EP | 0573321 A1 | * | 12/1993 | G01S 13/343 |
| EP | 2631612 A2 | | 8/2013 | |

\* cited by examiner

REDUCTION OF POWER PEAKS IN THE SPECTRUM OF THE MEAN POWER OF FILL LEVEL MEASURING DEVICES

REFERENCE TO RELATED APPLICATIONS

This application claims the benefit of the filing date of European Patent Application No. 16 156 684.9 filed on 22 Feb. 2016, the disclosure of which is hereby incorporated herein by reference.

FIELD OF THE INVENTION

The invention relates to level measurement. In particular, the invention relates to a method for reducing power peaks in the frequency spectrum of the mean power of the transmission signal of fill level measuring devices, to a level radar, to a program element and to a computer-readable medium.

BACKGROUND

When determining the level of a filling material in a vessel or outside of closed vessels (free field), fill level measuring devices can be used, which emit radar or ultrasonic signals towards the filling material and register the signal reflected at the filling material, in order to ascertain a level therefrom.

In the spectra of the power averaged over time of fill level measuring devices (also termed RMS spectrum (RMS=Root Mean Square)), which emit radar waves, for example, in the form of frequency-modulated continuous wave (FMCW) signals as a transmission signal or measuring signal for measuring the level, power peaks can occur at certain frequencies of the transmission signal. These power peaks can arise due to the transmission signal remaining at a certain frequency.

In the case in particular in which radar waves are used in level measurement, statutory requirements exist with regard to a maximum mean power level of the radiated signal. So as not to exceed permitted transmission levels, to which harmonised standards apply in the EU, for example, the transmission level can generally be kept correspondingly low. Another option for not exceeding permissible limit values for the mean power of a transmission level consists in emitting the radar signals in a clocked manner. In this case, a radar signal is emitted by the fill level measuring device within an active period. An inactive period then follows, within which the fill level measuring device or the radar system of the fill level measuring device that is responsible for generating and emitting the radar signal is switched off. The mean power of the emitted signal can be effectively reduced as a result. However, the peak power of the transmission signal cannot be influenced by this.

SUMMARY OF THE INVENTION

There is a desire to provide a method for reducing power peaks and level increases in the spectrum of the mean power of fill level measuring devices, as well as a fill level measuring device having an improved power spectrum with regard to the permitted maximum transmission level.

A fill level measuring device for determining a level of a filling material in a vessel using a frequency-modulated continuous wave (FMCW) signal, a method for operating a fill level measuring device using a frequency-modulated continuous wave signal, a program element and a computer-readable medium are provided according to the features of the independent claims. Developments of the invention can be found in the dependent claims.

According to one aspect of the invention, a fill level measuring device is provided for determining a level of a filling material in a vessel. The fill level measuring device can also be used to measure a mass flow of bulk material on a conveyor belt, for example. The fill level measuring device can operate using a frequency-modulated continuous wave signal. In this case, the fill level measuring device has at least the following components: a high-frequency circuit, by means of which a transmission signal can be generated, wherein the transmission signal has at least one frequency ramp; furthermore, a transmitting apparatus for the targeted emission of the transmission signal towards the filling material, and an evaluation unit for determining the level of the filling material based on a transmission signal reflected at the filling material. The frequency ramp of the transmission signal has a minimal frequency $f_{min}$ and a maximal frequency of $f_{max}$. When determining the level, the evaluation unit is designed to use only the part of the transmission signal reflected at the filling material that has frequencies lying within a fundamental frequency interval. In this case, the minimal frequency of the fundamental frequency interval is greater than the minimal frequency $f_{min}$ of the frequency ramp and/or the maximal frequency of the fundamental frequency interval is smaller than the maximal frequency $f_{max}$ of the frequency ramp.

A frequency ramp is understood to mean a transmission signal or a component of a transmission signal at which or within which the frequency rises monotonically or falls monotonically with time. A combination of the frequency monotonically rising and monotonically falling is also possible.

The transmission signal of the fill level measuring device can have a component of constant frequency over a certain period, for example, to which a frequency ramp connects, i.e. a component of the transmission signal within which the frequency increases or decreases monotonically with time. A transmission signal can also be given by one or more frequency ramps arranged temporally in a row or consecutively, without a period having to exist during which the signal remains at a constant frequency. Furthermore, it is possible that the transmission signal remains at a constant frequency during a subsequent period after passing through a frequency ramp. This frequency can be given by the maximal frequency of the frequency ramp, for example. Other combinations of the afore-described time dependence of the frequency of the transmission signal are also possible.

A fundamental frequency interval according to the invention is understood to be a frequency interval within which those frequencies lie that are taken into account in the determination of a level by the fill level measuring device. This means that the evaluation of a transmission signal of the fill level measuring device reflected at a filling material takes place only using frequency components of the reflected transmission signal that lie within the fundamental frequency interval.

The distinction between a fundamental frequency interval and a frequency range between the minimal frequency $f_{min}$ and the maximal frequency $f_{max}$ of a frequency ramp of a transmission signal has the following effect: a fill level measuring device operating with a frequency-modulated continuous wave signal has circuit parts that can have a certain settling or warm-up time. Transmission signals that are emitted during the period of the settling or warm-up time of these circuit parts cannot be used for a reliable measurement, i.e. for reliable determination of the level. A component of a transmission signal used for measurement can advantageously be given by a frequency ramp, i.e. signal components in which a transmission signal component having a constant frequency is emitted over a certain period can be undesirable when taking a measurement. On account of necessary settling or warm-up times, it might not be sensible to start directly with a frequency ramp. For this reason, it is possible to initially wait until after the settling or warm-up time at a constant frequency before the following part of the transmission signal is given by a frequency ramp. The present invention avoids the emission of a transmission signal component of constant frequency during the settling or warm-up period in that part the frequency ramp is already passed through during this period but is not used for the actual measurement. In this way, times in which a transmission signal component of constant frequency is emitted can be eliminated completely or at least significantly reduced.

According to one embodiment of the invention, this part of the frequency ramp lies below the fundamental frequency interval (in the case of a rising frequency ramp). The fill level measuring device can be designed so that the minimal frequency of the fundamental frequency interval is only reached when the settling time has elapsed.

According to another embodiment of the invention, this part of the frequency ramp lies above the fundamental frequency interval (in the case of a falling frequency ramp). The fill level measuring device can be designed so that the maximal frequency of the fundamental frequency interval is only reached after the settling time has expired.

According to one embodiment of the invention, the minimal frequency of the fundamental frequency interval is greater than the minimal frequency $f_{min}$ of the frequency ramp. The high-frequency circuit is designed in this case exclusively to generate at least one frequency ramp, so that the transmission signal has no continuous wave signal having a constant frequency. The process described here can result in a power spectrum entirely devoid of any peaks.

According to this embodiment, the transmission signal can consist of a plurality of frequency ramps, but consists in any case of at least one frequency ramp. If a plurality of frequency ramps is used, the frequency of the transmission signal increases with time in a monotonic manner from a minimal to a maximal frequency, for example, and subsequently jumps back to the minimal frequency, in order to rise, as before, from the minimal to the maximal frequency in a monotonic manner with time. The transmission signal thus has no continuous wave signal having a constant frequency. A continuous wave signal having a constant frequency is understood in this case to mean a signal with a frequency that is constant over a period that is generally much smaller than the time interval within which the frequency ramp is passed through. For example, the period or duration during which a constant continuous wave signal is radiated can be given by the settling or warm-up time of circuit parts of the fill level measuring device.

According to another embodiment of the invention, the transmission signal has a continuous wave signal having a constant frequency $fs_{min}$ before the frequency ramp. The minimal frequency $f_{min}$ of the frequency ramp corresponds in this case to the frequency $fs_{min}$. The period during which a continuous wave signal of constant frequency is radiated can be smaller in this case than the settling or warm-up time of circuit parts of the fill level measuring device.

In other words, this means that, in this embodiment, the transmission signal initially has a constant input at fixed frequency $f_{Smin}$, in order then to pass through a frequency ramp, starting at the frequency $f_{min}$ up to a maximal frequency $f_{max}$ of the frequency ramp. Since the minimal frequency $f_{min}$ of the frequency ramp corresponds to the frequency $f_{Smin}$, the transition from the constant continuous wave signal to the frequency ramp is steady. The period within which a continuous wave signal of constant frequency is emitted can be smaller, however, in particular much smaller, than the settling or warm-up time of circuit parts of the fill level measuring device. This means that circuit parts of the fill level measuring device are still settling or warming up while the frequency ramp has already been started.

According to another embodiment, the high-frequency circuit of the fill level measuring device is designed to generate the frequency ramp of the transmission signal by means of a phase-locked loop (PLL). Integrated PLL modules having a built-in ramp generator offer this possibility without any additional circuit outlay. In this case, the frequency of the transmission signal is increased by a predefined value after every clock signal that is present at the PLL module. The minimal frequency of the fundamental frequency interval is only reached after a set number of clock signals.

This means that the transmission signal has a share of frequencies that are outside the fundamental frequency interval. These frequencies outside the fundamental frequency interval are not taken into account when evaluating a transmission signal reflected at the filling material.

According to another embodiment the high-frequency circuit is designed to generate the frequency ramp of the transmission signal in a phase-locked loop by means of regularly successive clock signals at a PLL module, and in the course of this to increase the frequency of the transmission signal after each clock signal by a predefined value. The maximal frequency of the transmission signal is reached in this case only after a set number of clock signals and exceeds the maximal frequency of the fundamental frequency interval. The maximal transmit frequency in this case is thus greater than the maximal frequency of the fundamental frequency interval.

According to one embodiment of the invention, the fundamental frequency interval can lie in the range between 24 and 26.5 GHz. The fundamental frequency interval can also lie between 75 and 85 GHz. It can further be provided that the difference between the minimal frequency of the fundamental frequency interval and the minimal frequency $f_{min}$ of the frequency ramp of the transmission signal is greater than 100 MHz or greater than 5% or 10% of the fundamental frequency interval and/or the difference between the maximal frequency $f_{max}$ of the frequency ramp and the maximal frequency of the fundamental frequency interval is greater than 100 MHz. It can also be provided that at least one of the aforementioned differences is greater than 10 MHz, greater than 50 MHz, or greater than 200 MHz.

The frequency difference can be determined in particular from the settling time of the phase-locked loop. The frequency $f_{min}$ of the frequency ramp can therefore be selected in such a way that the phase-locked loop is settled and locked no later than the point at which the minimal frequency of the fundamental frequency interval is reached.

In practice, this frequency difference then actually varies in the range of from 10 MHz to 200 MHz, for example.

According to another aspect of the invention, a method is provided for operating a fill level measuring device using a frequency-modulated continuous wave (FMCW) signal, wherein the method comprises the subsequently mentioned steps: determining a minimal frequency $f_{min}$ and a maximal frequency $f_{max}$ for at least one frequency ramp of a transmission signal. Furthermore, determining a fundamental frequency interval, this fundamental frequency interval being characterised in that the minimal frequency of the fundamental frequency interval is greater than the minimal frequency $f_{min}$ of the frequency ramp and/or the maximal frequency of the fundamental frequency interval is smaller than the maximal frequency $f_{max}$ of the frequency ramp. In a further method step, the transmission signal having the at least one frequency ramp is generated. In another method step, the transmission signal is emitted towards the filling material. Finally, the transmission signal reflected at the filling material can be evaluated using only the part of the reflected transmission signal that has frequencies within the fundamental frequency interval.

Using this method, resting of a component of the transmission signal during the settling or warm-up time of circuit parts of the fill level measuring device can be avoided or at least significantly reduced. For example, the period in which a component of the transmission signal having a constant frequency is radiated is reduced by a factor of 4 compared with the settling or warm-up time. Reduction by a factor of 10 is also possible. Furthermore, a period during which a frequency-constant transmission signal is emitted can also be eliminated completely. In the aforementioned cases, the transmission signal can already pass through part of a frequency ramp during the settling or warm-up time. On expiry of the settling time, a minimal or, in the case of a falling frequency ramp, a maximal frequency of the fundamental frequency interval is then attained along the frequency ramp. The transmission signal components for determining the level are used after this frequency.

According to another aspect of the invention, a program element is specified that, when executed on a processor of a fill level measuring device, prompts the fill level measuring device to carry out the steps indicated in the context of the method described above.

According to another aspect of the invention, a computer-readable medium is provided, on which a program element having the aforementioned features is stored.

Embodiments of the invention are described below with reference to the drawings.

BRIEF DESCRIPTION OF THE FIGURES

FIG. 1b shows a block diagram comprising components of a fill level measuring device according to an embodiment of the invention.

DETAILED DESCRIPTION OF EMBODIMENTS

Embodiments of the invention are illustrated below with reference to the figures. Features and properties that are described in connection with a fill level measuring device can likewise be transferred to the method in this case, as, vice versa, steps of the method can be implemented in the fill level measuring device and its operation.

The representation in the figures is schematic and not to scale. Where the same reference signs are used in different figures, these denote the same or similar elements.

Figure 1A:
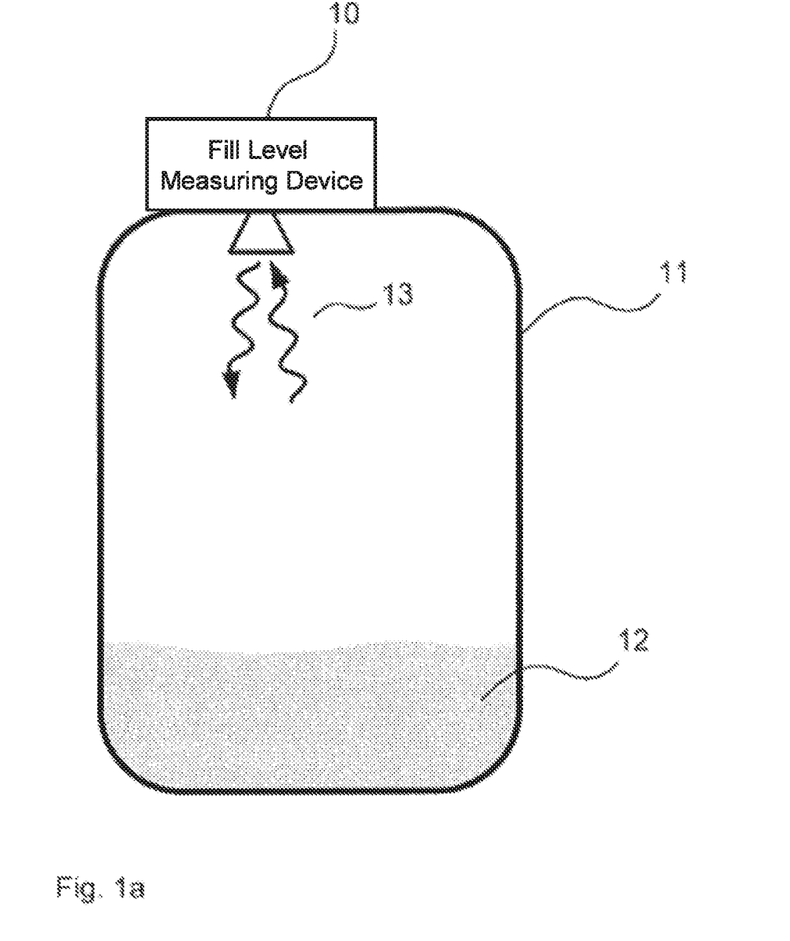
FIG. 1a shows a fill level measuring device comprising a vessel containing a filling material.

FIG. 1a shows a fill level measuring device 10, which is attached to an upper vessel wall of a vessel or container 11 or is inserted at least in part into the interior of the vessel through an opening in the upper vessel wall. Located inside the vessel 11 is a filling material 12. To determine the level of the filling material 12 inside the vessel 11, the fill level measuring device 10 can emit transmission signals 13 towards the filling material, which are reflected at the filling material and then registered by the fill level measuring device and used to calculate the level. The signals emitted can be radar signals, for example. However, it is also possible that ultrasonic signals are used in the level measurement. A transmission signal comprises a certain established frequency range in this case. Statutory requirements or statutory standards can exist that set out certain frequency bands within which the frequencies of the signals of a fill level measuring device may lie. In the case of fill level measuring devices that use radar signals for contactless level measurement, permitted transmission frequencies lie within the K band, for example, i.e. between 24.05 GHz and 26.5 GHz, or within the W band, i.e. between 75 GHz and 85 GHz. Statutory requirements may also exist with regard to a maximal mean power level per frequency within one of the statutorily permissible frequency bands. Due to periods in which the transmission signal of a fill level measuring device remains at a constant frequency, corresponding increases in the mean power level result at this frequency.

A fill level measuring device can have electronics, for example, reproduced by the block circuit diagram in FIG. 1b. The electronics of the fill level measuring device 10 have an energy supply unit or energy supply 101, which supplies a processor 102, a voltage-controlled oscillator (VCO) 107 and an HF circuit 108 with energy. The processor 102 is connected to an interface 103. A user can enter the frequency range to be used by the fill level measuring device for measurements into this interface 103, for example. Inputting of other data into the interface, such as the repetition rate of measurements, is also possible. This information entered can be transmitted in turn to the processor 102. Connected to the interface 103 on the other side is a fractional-N module 104. This fractional-N module 104 receives signals of a reference oscillator 105 and in turn forwards signals to a filter 106, which in turn supplies these signals to the voltage-controlled oscillator 107. The voltage-controlled oscillator 107 is connected in turn on one side to the fractional-N module 104, either directly or via a divider circuit (prescaler), and to the RF circuit 108 on the other side.

The actual phase-locked loop 110 is formed by the components: fractional-N PLL module 104, loop filter 106 and the voltage-controlled oscillator 107. The locked loop is closed by the feedback path from 107 to 104.

The RF circuit 108 can contain, in particular, active circuits (multiplier, amplifier) as well as passive elements (couplers, circulators) and other components. Signals of the RF circuit are placed at the RF output 109 and then emitted as transmission signals from the fill level measuring device 10 towards the filling material. The fractional-N module 104, loop filter 106 and voltage-controlled oscillator 107 components described above can be used to generate a frequency-modulated continuous wave (FMCW) signal.

Figure 2:
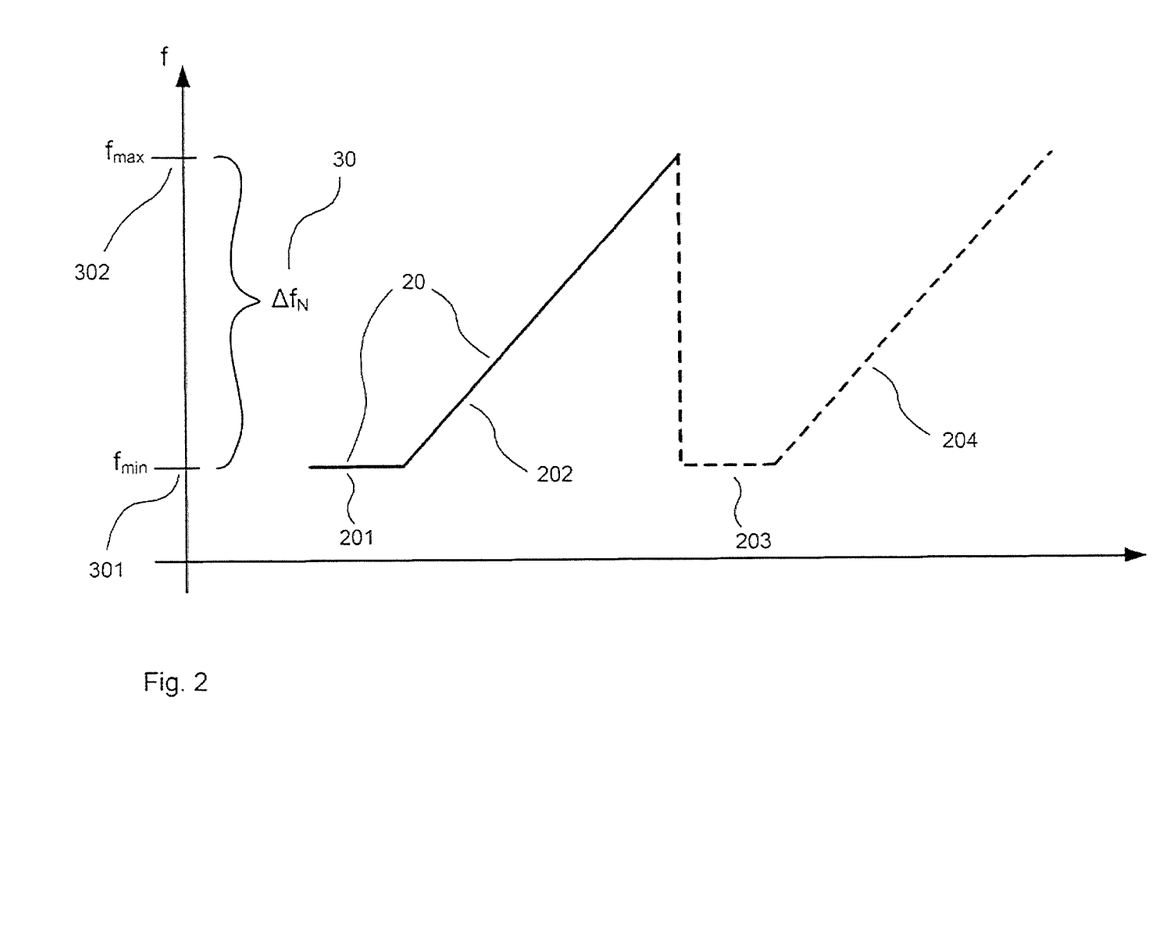
FIG. 2 shows the frequency of a transmission signal of a fill level measuring device as a function of time.

FIG. 2 shows an example of the time dependence of the frequency of a transmission signal, a frequency-modulated continuous wave signal, of a fill level measuring device 10 such as can have been produced by the components in the block circuit diagram shown in FIG. 1b. The transmission signal 20 initially has a frequency-constant input 201 as a function of time. The frequency of this constant input corresponds to the minimal frequency $f_{min}$ of the transmission signal. Following on from the constant frequency is a frequency ramp 202 of the transmission signal 20. The frequency ramp is characterised by a monotonic rise in the frequency of the transmission signal as a function of time from the minimal frequency $f_{min}$ up to a maximal frequency $f_{max}$ of the transmission signal. It can be provided that the transmission unit of the fill level measuring device is switched off or switches off after the maximal frequency $f_{max}$ of the transmission signal is reached. If this is the case, the transmission signal 20 consists only of a signal component 201 of constant frequency, to which a frequency ramp 202 is attached. However, it is also possible that a transmission signal 20 is obtained by a time sequence of signals of the pattern described above. In this case, the transmission unit of the fill level measuring device is not switched off on reaching the maximal transmission frequency $f_{max}$, but the transmission frequency is reset to the minimal value $f_{min}$ and a signal component of constant frequency is emitted again for a limited time. This signal component is designated by the reference sign 203 in FIG. 2. Connected in turn to this portion of the transmission signal is a frequency ramp 204, in which frequencies, increasing monotonically with time, are run through from a minimal frequency $f_{min}$ up to a maximal frequency $f_{max}$.

In FIG. 2 the fundamental frequency interval $\Delta f_N$ 30 is characterised by a minimal frequency 301 and a maximal frequency 302. In the case of FIG. 2, the minimal frequency of the fundamental frequency interval 30 coincides with the minimal transmission frequency $f_{min}$, and the maximal frequency 302 of the fundamental frequency interval 30 coincides with the maximal transmission frequency $f_{max}$. Furthermore, it can be seen in FIG. 2 that the periods in which the transmission signal remains at the constant frequency $f_{min}$ are of the same magnitude as the periods in which a frequency ramp is run through at 202, 204. The times at a fixed frequency can also be much shorter or longer than the ramp.

The frequency-stable inputs 201, 203 of the transmission signal 20 can result from the fact that the voltage-controlled oscillator pauses at least at the beginning of a frequency sweep and possibly also at the end of a frequency sweep. The terms frequency sweep and frequency ramp can be used equivalently.

Such "standing times", during which a constant frequency is emitted, are typically necessary to switch on following active circuit parts, such as multipliers, amplifiers and other components. In other words, if the fundamental transmission range 30 is characterised by the minimal transmission frequency $f_{min}$ and the maximal transmission frequency $f_{max}$ of the fill level measuring device, as shown in FIG. 2, a certain amount of time needs to pass initially before running through a frequency ramp 202, within which period corresponding electronic components are switched on and can settle. However, an increase at the frequency $f_{min}$ in the spectrum of the mean power of the transmission signal results from the frequency component that remains constant over a certain period at the frequency $f_{min}$ in FIG. 2, for example. To be able to avoid such an increase in the power spectrum and not exceed maximal permissible limit values without lowering the transmission level as a whole across the entire frequency range of the transmission signal, the invention proposes, for example, the frequency dependencies of the transmission signal shown in FIG. 3 or FIG. 4 as a function of time.

Figure 3:
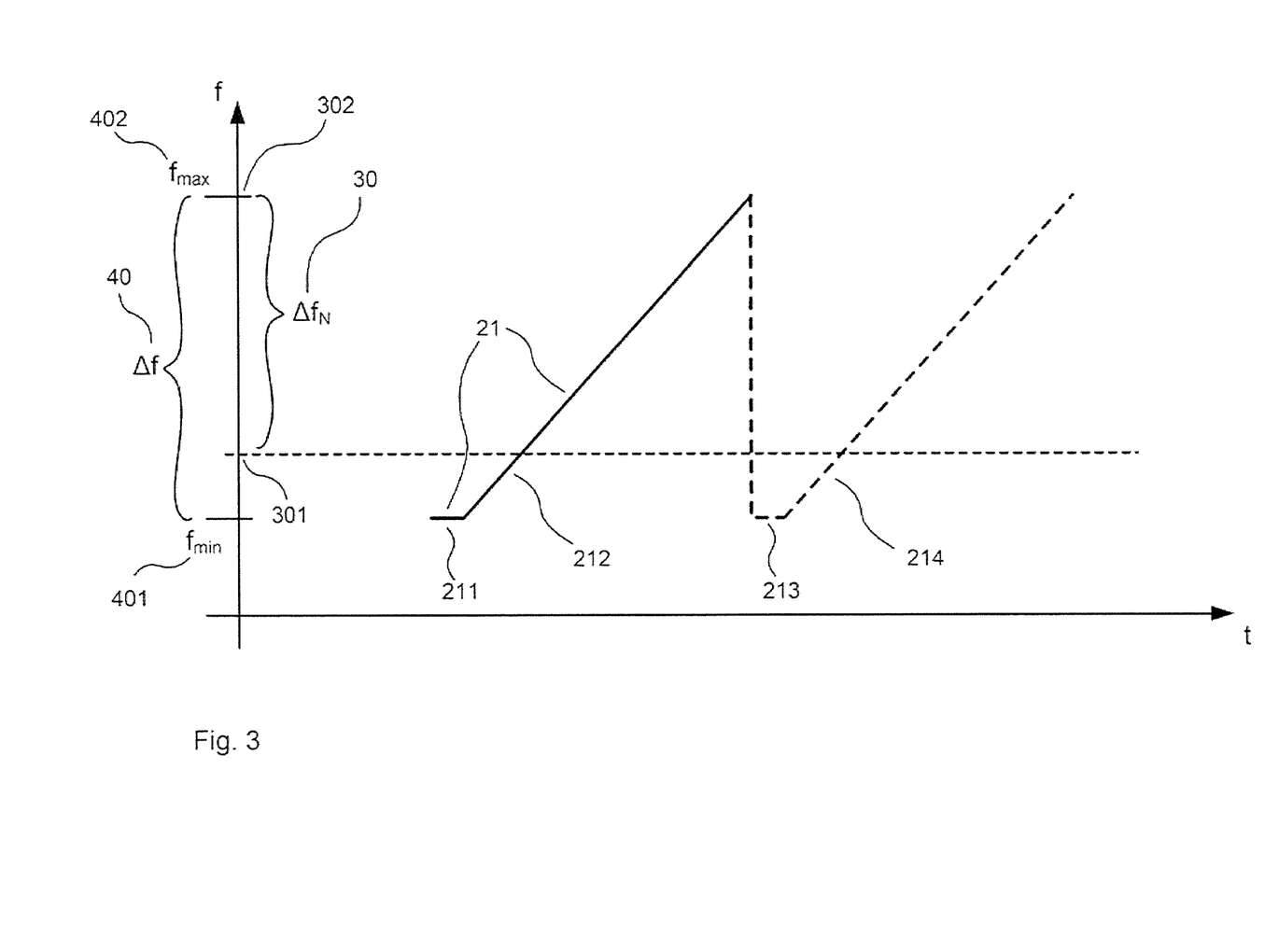
FIG. 3 shows the frequency of a transmission signal of a fill level measuring device comprising a frequency ramp as a function of time according to an embodiment of the invention.

In FIG. 3, the frequency of a transmission signal 21 of a fill level measuring device is shown as a function of time. The measuring signal 21 here has a minimal frequency $f_{min}$, 401, and a maximal frequency $f_{max}$, 402. This means that the frequencies of the transmission signal 21 lie within a transmission frequency interval $\Delta f$, 40. The fundamental frequency interval or fundamental frequency range, 30, i.e. the frequency interval $\Delta f_N$ having a minimal frequency 301 and a maximal frequency 302, lies within the transmission frequency interval $\Delta f$ 40. Only the transmission frequencies within the fundamental frequency interval 30 are to be used in the course of level determination on the basis of a transmission signal reflected at a filling material. The transmission signal 21 has a component 211 having a constant frequency and a frequency ramp 212. It is possible for the transmission signal 21 to consist only of the aforementioned components 211, 212. However, it is also possible that the transmission signal, after reaching the maximal transmission frequency value $f_{max}$ 402, at the end of the frequency ramp 212, jumps back to the minimal frequency value $f_{min}$ 401, of the transmission signal and a constant frequency component of the transmission signal, 213, in turn attaches itself to the frequency ramp at the frequency $f_{min}$ 401. A frequency ramp 214 having frequencies between the minimal frequency $f_{min}$ and the maximal frequency $f_{max}$ can in turn attach itself to this frequency-constant component 213. In particular, the transmission signal can be composed of a plurality of the transmission signal components described above. However, it is also possible that the transmission signal 21 consists only of a frequency-constant input 211 and a connecting frequency ramp 212.

Compared with the transmission signal 20 shown in FIG. 2, the transmission signal 21 shown in FIG. 3 is characterised in that the frequency-constant input at the minimal transmission frequency $f_{min}$, 401, is emitted in a shorter time interval. Due to the shorter period in which a signal, for example a continuous wave signal of constant frequency $f_{min}$, is radiated, the mean power level of the transmission signal 21 at the minimal transmission frequency $f_{min}$ 401 is lower than the mean power level of the transmission signal 20 at the minimal transmission frequency $f_{min}$ 301 of the example in FIG. 2. However, the period within which the transmission signal remains at the minimal transmitter frequency $f_{min}$ 401 can be smaller in the case in FIG. 3 than the settling or warm-up time of circuit parts of the fill level measuring device. This means that components of the transmission signal that are emitted within the settling time of the circuit parts of the fill level measuring device cannot be used for measuring purposes, as reliable transmission signal components that can be used for determining the level are only produced once the settling time has expired. The issue that components of the frequency ramp 212 in FIG. 3 that are attached directly to the frequency-constant component 211 of the transmission signal 21 are not to be used for measuring the level on account of the not yet expired settling time of circuit parts of the fill level measuring device, is countered by the fact that the fundamental frequency interval 30, within which the frequencies used for level measurement lie, has a minimal frequency 301 that is reached along the frequency ramp only following expiry of the necessary settling or warm-up time, for example.

This effectively means that a desired fundamental frequency interval 30 can first be selected or predetermined. Furthermore, the settling or warm-up time of circuit parts of the fill level measuring device can be known. Instead of using a transmission signal component of constant frequency, to which a frequency ramp is attached, for level measurement during the settling time, one concept of the invention consists in expanding the frequency ramp to smaller frequencies, i.e. frequencies that are smaller than the minimal frequency 301 of the fundamental frequency interval. However, only frequencies within the fundamental frequency interval 30 are to be used for level measurement. In this way, standing times, i.e. times in which the transmission signal 21 is characterised by a constant frequency value $f_{min}$ 401, can be reduced. The mean power level at the "standing frequency", i.e. at the frequency value of the transmission signal that is constant over a certain period, is advantageously reduced thereby. It is thus advantageously possible to maintain the warm-up and settling times of circuit parts of the fill level measuring device as a result and to distribute the power radiated by the fill level measuring device in these periods over a larger frequency range defined by the frequency ramp, instead of radiating the power during the settling or warm-up time at a fixed frequency, meaning the start or the end frequency of the frequency ramp, for example.

The frequency ramps described above and/or below can be generated stepwise in a radar system of a fill level measuring device that can generate a frequency-modulated continuous wave signal, for example in a phase-locked loop by means of a clock signal at a fractional-N module. In this case, the output frequency of the voltage-controlled oscillator connected downstream in the circuit diagram is increased by a certain fixed magnitude in each clock cycle. In this way, the particular output frequency in each clock cycle is known and defined precisely. According to the invention, the starting frequency of the transmission signal is set at a value that is lower than the minimal value of the fundamental frequency interval. A corresponding frequency ramp is produced by "pulsing up" the phase-locked loop until at least the set maximal frequency of the fundamental frequency interval is reached. However, it is also possible for a maximal transmission frequency that is greater than the maximal frequency of the fundamental frequency range to be set. The minimal frequency of the fundamental frequency range 30 is reached after the beginning of the frequency ramp only after a defined number of steps. Only upon reaching the minimal frequency of the fundamental frequency range does the frequency range of the transmission signal that is used for level measurement begin. In this way, it is possible to prevent the fill level measuring device remaining at a constant value during the warm-up or settling times of circuit parts of the fill level measuring device, which value could correspond to the minimal value of the frequency ramp and the minimal value of the fundamental frequency interval, for example.

Figure 4A:
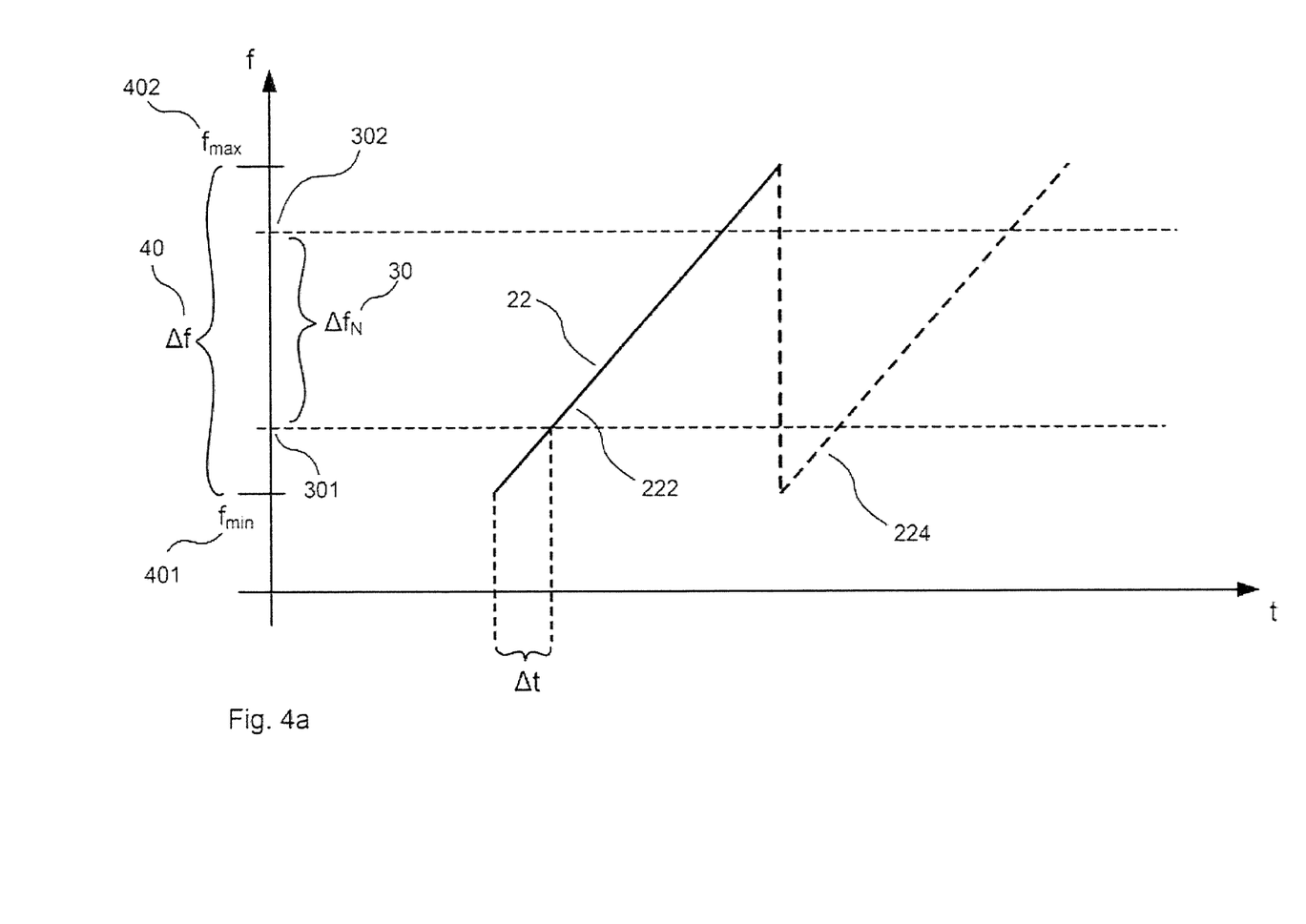
FIG. 4a shows the dependence of the frequency of a transmission signal on time according to another embodiment of the invention.

FIG. 4a shows the frequency dependence of the transmission signal 22 as a function of time according to another embodiment of the invention. The transmission signal 22 accordingly has frequencies within a frequency interval Δf, 40, between a minimal frequency $f_{min}$ 401 and a maximal frequency $f_{max}$ 402. Located within this transmission frequency interval Δf 40 is the fundamental frequency interval $Δf_N$, 30, having a minimal frequency 301 and a maximal frequency 302 of the fundamental frequency interval. The transmission signal 22 is given solely by at least one frequency ramp 222. A component of the transmission signal having a constant frequency is thus eliminated compared with the cases in FIGS. 2 and 3. The transmission signal 22 can in turn be made up of several identical, temporally successive frequency ramps 222, 224. As is evident from FIG. 4, the minimal frequency $f_{min}$ 401 of the transmission signal 22 is smaller than the minimal frequency 301 of the fundamental frequency interval $Δf_N$, 30. The maximal frequency $f_{max}$ 402 of the transmission signal 22 is also greater in this embodiment than the maximal frequency 302 of the fundamental frequency interval 30. Within a time interval Δt, the frequencies of the transmission signal can increase along the frequency ramp from the minimal value $f_{min}$ 401 of the transmission signal 22 to the minimal value 301 of the fundamental frequency interval. According to the invention, the time Δt is intended to correspond at least to the warm-up or settling time of circuit parts of the fill level measuring device. The frequency dependence of the transmission signal as a function of time can thus assume a sawtooth-like progression, for example, as shown in FIG. 4. Due to the fact that the minimal frequency of the fundamental frequency interval is only reached after the time Δt, the necessity of settling or warm-up times of circuit parts of the Fill level measuring device can continue to be taken into account without having an increased level of the mean power at a "standing frequency" before running through the frequency ramp 222, 224.

Figure 4B:
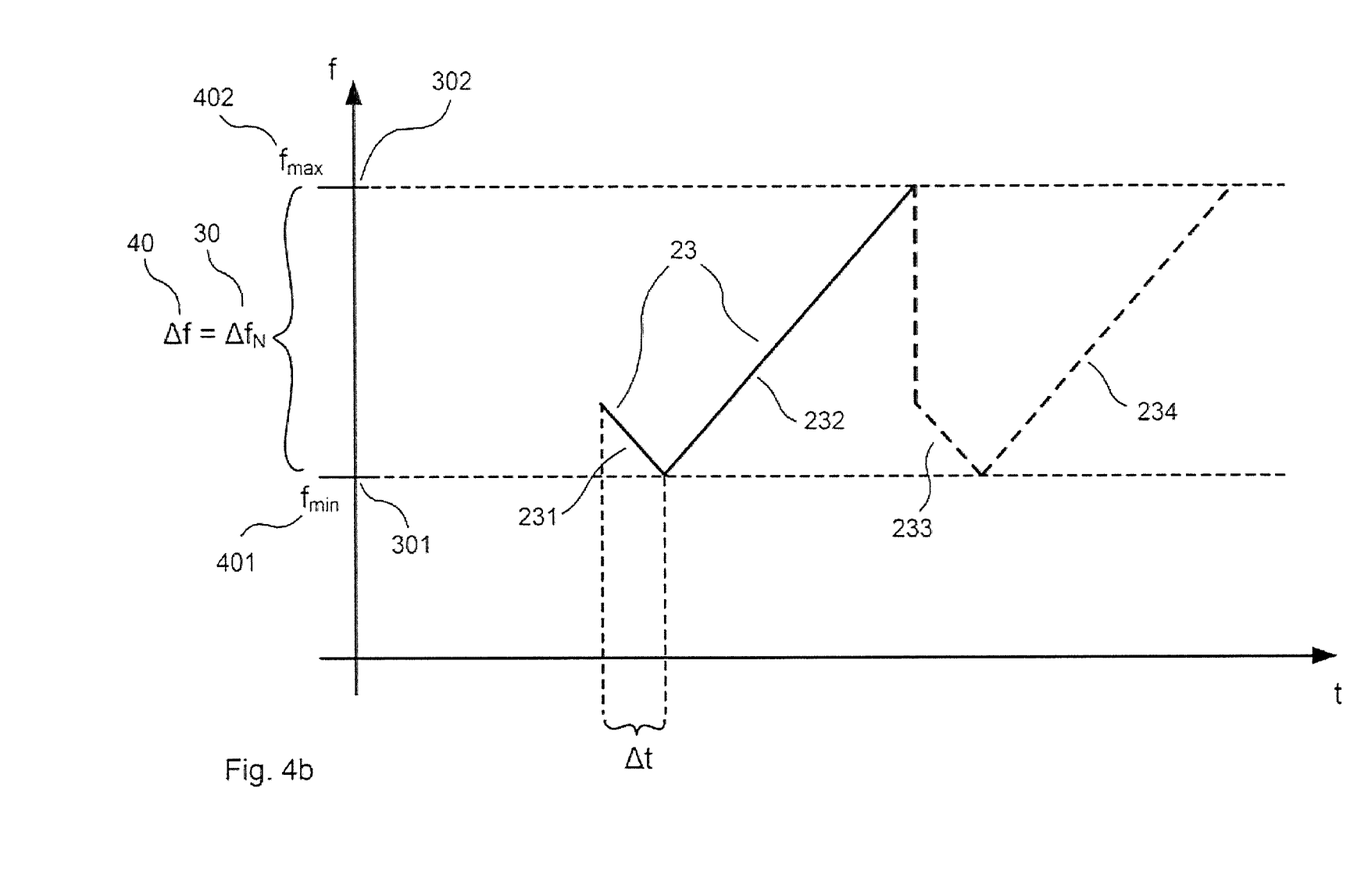
FIG. 4b shows the dependence of the frequency of a transmission signal on time according to another embodiment of the invention.

The frequency ramp can also start within the fundamental frequency band during the warm-up/settling time and then first run to the starting value of the desired frequency ramp (in the frequency downwards) as shown in FIG. 4b. The frequency range would not be enlarged beyond the fundamental frequency range as a result. Although part of the frequency spectrum used would be "run through" twice, resulting in a level increase by 3 dB, no "spike" or peak 512 occurs (cf. FIG. 5).

An advantage compared with the signal progression in FIG. 4a consists in the fact that no frequency spectrum is "wasted", i.e. $Δf=Δf_N$. The fundamental frequency interval 30 is identical to the transmission frequency interval 40.

Figure 5:
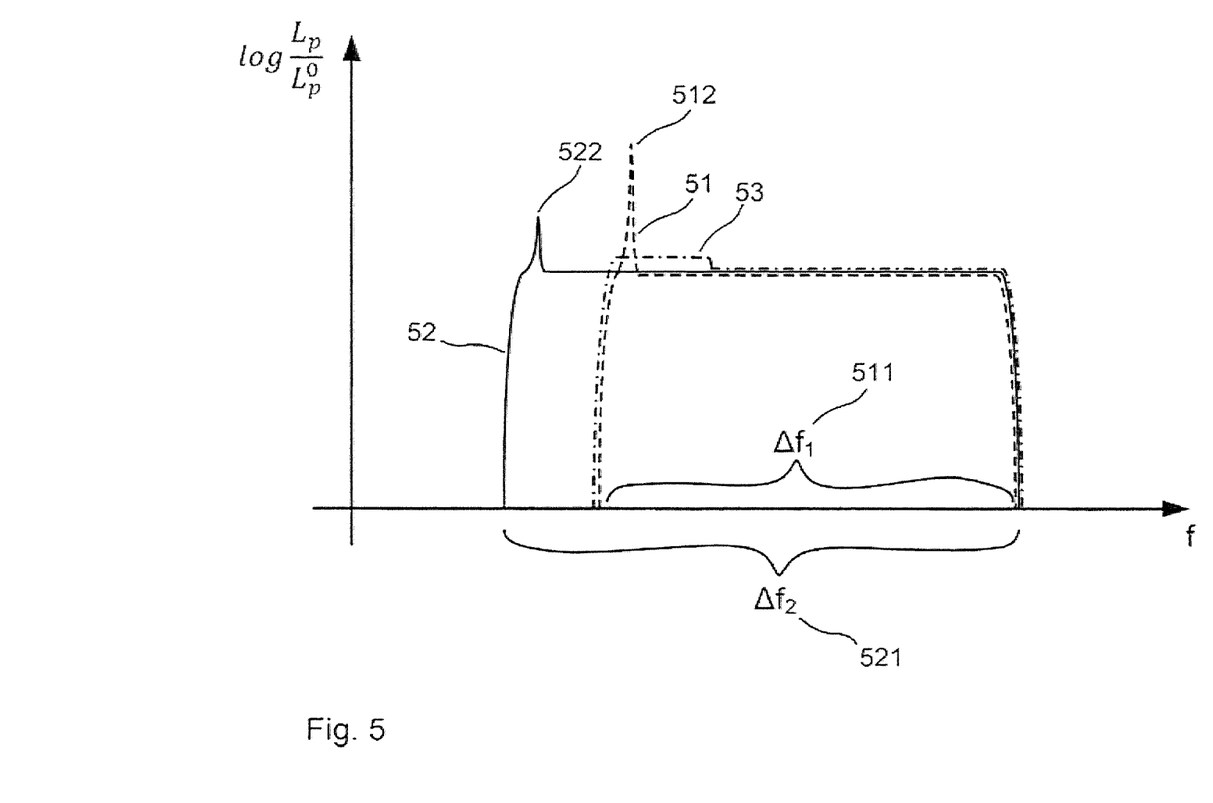
FIG. 5 shows the frequency dependence of the spectrum of the mean power of different transmission signals, which were generated using a frequency-modulated continuous wave signal.

FIG. 5 shows a logarithmic representation of the standardised power spectrum Lp 51, 52, averaged over time, of transmission signals as a function of the frequency, such as can be measured and represented by a spectrum analyser. The logarithmised power spectrum 51 can be the power spectrum of the transmission signal 20 shown in FIG. 2, for example. The logarithmised power spectrum 52 can correspond in turn to the power spectrum of the transmission signal 21 shown in FIG. 3. The power spectrum 51 has a power peak 512 at the minimal frequency of the frequency interval $Δf_1$, 511. The frequency interval $Δf_1$, 511, comprises all frequencies of the transmission signal forming the basis of the power spectrum 51. The power peak 512 results from the component of the underlying transmission signal in which the transmission signal remains at a constant frequency during a certain time interval, for example the settling time of circuit parts, before it runs through the frequency ramp.

A power peak 522 is likewise to be found in the power spectrum 52, wherein said power peak is considerably reduced in magnitude compared with the power peak 512 of the power spectrum 51. The power spectrum 52 corresponds to a transmission signal having transmission frequencies within a frequency interval $\Delta f_2$, 521, wherein the power peak 522 is located in the power spectrum at the minimal frequency of the frequency interval $\Delta f_2$ 521. This power peak 522 also derives from a frequency component of the transmission signal that is constant over a limited time interval, but the time in which the corresponding transmission signal has a constant component is shorter in the case of curve 52 than in the case of curve 51. This results in the reduction of the power peak 522 compared with the power peak 512. Except for the power peaks 512 and 522, the power spectra of the mean power 51 and 52 are each normally largely constant within the frequency intervals $\Delta f_1$, 511, and $\Delta f_2$, 521. This is due to the fact that the energy radiated by a corresponding fill level measuring device in the case of the fill level measuring devices on which FIG. 5 is based is virtually independent of frequency and the two frequency ramps 202 and 212 forming the basis of the averaged power spectra 51 and 52, respectively, have the same slopes. Due to the reduction shown in the power peak in the spectrum of the mean power, the problem of maximum power levels that are reached at a certain frequency can be avoided with the same energy radiation by the fill level measuring device over a predetermined measuring period. In the case of a transmission signal such as that shown in FIG. 4b in particular, in the power spectrum according to FIG. 5 there would no longer be a power peak in the power spectrum, but a flat, slightly raised progression 53.

Figure 6:
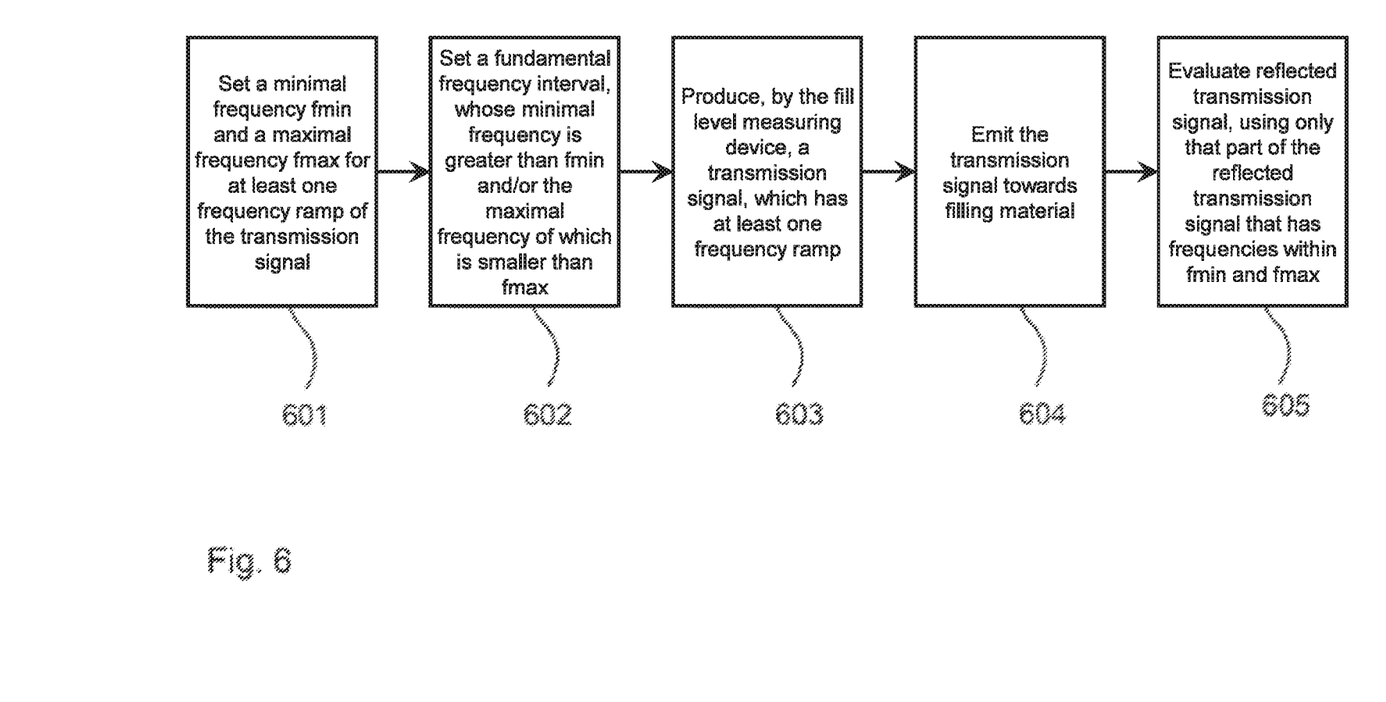
FIG. 6 shows a flow chart for a method for operating a fill level measuring device according to an embodiment of the invention.

FIG. 6 shows a flow chart of a method for operating a fill level measuring device, in which power peaks in the frequency spectrum of the mean power of the fill level measuring device are prevented or reduced. In a step 601, a minimal frequency $f_{min}$ and a maximal frequency $f_{max}$ are set for at least one frequency ramp of the transmission signal. In a step 602, a fundamental frequency interval is set, the minimal frequency of which is greater than the minimal frequency of the frequency ramp and/or the maximal frequency of which is smaller than the maximal frequency $f_{max}$ of the frequency ramp. It is also possible that the step 602 of setting the fundamental frequency interval takes place before the step of setting a minimal frequency $f_{min}$ and a maximal frequency $f_{max}$ of a frequency ramp, 601. In a subsequent step 603, the transmission signal having at least one frequency ramp is produced by the fill level measuring device in order to be emitted in a following step 604 towards a filling material. In step 605, a transmission signal reflected at the filling material is evaluated using only that part of the reflected transmission signal having frequencies within the fundamental frequency interval set in step 602.

It should also be pointed out that "comprising" and "having" do not exclude the possibility of any other elements or steps and the indefinite article "a" or "an" does not exclude the possibility of a plurality. It should also be pointed out that features or steps described with reference to one of the above embodiments can also be used in combination with other features or steps of other embodiments described above. Reference signs in the claims should not be regarded as limitations.

The invention claimed is:

1. A fill level measuring device for determining a level of a filling material in a vessel using a frequency-modulated continuous wave (FMCW) signal, the fill level measuring device comprising:

a high-frequency circuit configured to generate a transmission signal, wherein the transmission signal has at least one frequency ramp;

a transmission apparatus configured to emit the transmission signal towards the filling material; and evaluation circuitry configured to determine the level of the filling material on the basis of the transmission signal reflected by the filling material, wherein the at least one frequency ramp has a minimal frequency $f_{min}$ and a maximal frequency $f_{max}$, wherein, when determining the fill level, the evaluation circuitry is configured to take account exclusively of a part of the reflected transmission signal having frequencies within a fundamental frequency interval, and wherein a minimal frequency of the fundamental frequency interval is greater than the minimal frequency $f_{min}$ of the at least one frequency ramp and/or a maximal frequency of the fundamental frequency interval is smaller than the maximal frequency $f_{max}$ of the at least one frequency ramp.

2. The fill level measuring device according to claim 1, wherein the minimal frequency of the fundamental frequency interval is greater than the minimal frequency $f_{min}$ of the at least one frequency ramp, and wherein the high-frequency circuit is configured to generate exclusively the at least one frequency ramp so that the transmission signal has no continuous wave signal having a constant frequency.

3. The fill level measuring device according to claim 1, wherein the transmission signal, before the at least one frequency ramp, has a continuous wave signal having a constant frequency $f_{Smin}$, and wherein the minimal frequency $f_{min}$ of the at least one frequency ramp coincides with the frequency $f_{Smin}$.

4. The fill level measuring device according to claim 1, wherein the high-frequency circuit is configured to generate the at least one frequency ramp of the transmission signal by regularly successive clock signals at a phase-locked loop with a ramp generator, wherein the high-frequency circuit is configured to increase the frequency of the transmission signal by a predefined value after every clock signal, and wherein the minimal frequency of the fundamental frequency interval is reached only after a set number of clock signals.

5. The fill level measuring device according to claim 1, wherein the high-frequency circuit is configured to generate the at least one frequency ramp of the transmission signal by regularly successive clock signals at a phase-locked loop, wherein the high-frequency circuit is configured to increase the frequency of the transmission signal by a predefined value after every clock signal, and wherein the maximal frequency of the transmission signal is reached only after a set number of clock signals after the maximal frequency of the fundamental frequency interval has been reached.

6. The fill level measuring device according to claim 1, wherein the fundamental frequency interval lies in a range between 24.05 and 26.5 GHz or between 75 and 85 GHz, and wherein a difference between the minimal frequency of the fundamental frequency interval and the minimal frequency $f_{min}$ of the at least one frequency ramp of the transmission signal is greater than 100 MHz and/or a difference between the maximal frequency $f_{max}$ of the frequency ramp and the maximal frequency of the fundamental frequency interval is greater than 100 MHz.

7. A method of determining, using a fill level measuring device, a fill level of a filling material in a vessel using a frequency modulated continuous wave signal (FMCW), the method comprising:
    determining a minimal frequency $f_{min}$ and a maximal frequency $f_{max}$ for at least one frequency ramp of a transmission signal;
    determining a fundamental frequency interval, wherein a minimal frequency of the fundamental frequency interval is greater than the minimal frequency $f_{min}$ of the at least one frequency ramp and/or a maximal frequency of the fundamental frequency interval is smaller than the maximal frequency $f_{max}$ of the at least one frequency ramp;
    generating the transmission signal with the at least one frequency ramp;
    emitting the transmission signal in a direction of the filling material; and
    evaluating the transmission signal reflected by the filling material using only a part of the reflected transmission signal with frequencies within the fundamental frequency interval.

8. The method according to claim 7,
    wherein the minimal frequency of the fundamental frequency interval is greater than the minimal frequency $f_{min}$ of the at least one frequency ramp, and
    wherein a high-frequency circuit is configured to generate exclusively the at least one frequency ramp so that the transmission signal has no continuous wave signal having a constant frequency.

9. The method according to claim 7,
    wherein the transmission signal, before the at least one frequency ramp, has a continuous wave signal having a constant frequency $f_{Smin}$, and
    wherein the minimal frequency $f_{min}$ of the at least one frequency ramp coincides with the frequency $f_{Smin}$.

10. The method according to claim 7, further comprising:
    generating, using a high-frequency circuit, the at least one frequency ramp of the transmission signal by regularly successive clock signals at a phase-locked loop with a ramp generator,
    increasing, using the high-frequency circuit, the frequency of the transmission signal by a predefined value after every clock signal,
    wherein the minimal frequency of the fundamental frequency interval is reached only after a set number of clock signals.

11. The method according to claim 7, further comprising:
    generating, using a high-frequency circuit, the at least one frequency ramp of the transmission signal by regularly successive clock signals at a phase-locked loop,
    increasing, using the high-frequency circuit, the frequency of the transmission signal by a predefined value after every clock signal,
    wherein the maximal frequency of the transmission signal is reached only after a set number of clock signals after the maximal frequency of the fundamental frequency interval has been reached.

12. The method according to claim 7, wherein the fundamental frequency interval lies in a range between 24.05 and 26.5 GHz or between 75 and 85 GHz, and
    wherein a difference between the minimal frequency of the fundamental frequency interval and the minimal frequency $f_{min}$ of the at least one frequency ramp of the transmission signal is greater than 100 MHz and/or a difference between the maximal frequency $f_{max}$ of the at least one frequency ramp and the maximal frequency of the fundamental frequency interval is greater than 100 MHz.

13. A non-transitory computer readable medium having stored thereon a program element that when executed by a computer causes the computer to implement a method of determining, using a fill level measuring device, a fill level of a filling material in a vessel using a frequency modulated continuous wave signal, FMCW, the method comprising:
    determining a minimal frequency $f_{min}$ and a maximal frequency $f_{max}$ for at least one frequency ramp of a transmission signal;
    determining a fundamental frequency interval, wherein a minimal frequency of the fundamental frequency interval is greater than the minimal frequency $f_{min}$ of the at least one frequency ramp and/or a maximal frequency of the fundamental frequency interval is smaller than the maximal frequency $f_{max}$ of the at least one frequency ramp;
    generating the transmission signal with the at least one frequency ramp;
    emitting the transmission signal in a direction of the filling material; and
    evaluating the transmission signal reflected by the filling material using only a part of the reflected transmission signal with frequencies within the fundamental frequency interval.

* * * * *